US010411420B2

(12) United States Patent
Lokesh et al.

(10) Patent No.: US 10,411,420 B2
(45) Date of Patent: Sep. 10, 2019

(54) UNIVERSAL ELECTRICAL INSTALLATION SYSTEM

(71) Applicant: SCHNEIDER ELECTRIC INDUSTRIES SAS, Rueil Malmaison (FR)

(72) Inventors: Kushal Lokesh, Bangalore Karnataka (IN); Harish Raghavendra Rao, Bangalore Karnataka (IN); Arjun Harish, Bangalore Karnataka (IN)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 9 days.

(21) Appl. No.: 15/143,640

(22) Filed: May 2, 2016

(65) Prior Publication Data
US 2016/0322763 A1 Nov. 3, 2016

(30) Foreign Application Priority Data
Apr. 30, 2015 (IN) .............................. 489/KOL/2015

(51) Int. Cl.
H02G 3/16 (2006.01)
H01R 25/00 (2006.01)

(52) U.S. Cl.
CPC ............. *H01R 25/006* (2013.01); *H02G 3/16* (2013.01)

(58) Field of Classification Search
CPC .......... H02G 3/16; H02G 3/081; H02G 5/005; H01R 11/01; H01R 25/006; H01R 9/24;
(Continued)

(56) References Cited

U.S. PATENT DOCUMENTS 5,151,056 A 9/1992 McClune
6,636,401 B1 * 10/2003 Meiners ................... H02B 1/21
361/115
(Continued)

FOREIGN PATENT DOCUMENTS

EP 0063970 11/1982
GB 2446841 A * 8/2008 ............... H02G 3/08
(Continued)

OTHER PUBLICATIONS

Hubbell Incorporated "Pre-manufactured Wiring Systems" Copyright Rough-in Ready 2012 online link: http://www.hubbell-wiring.com/Press/pdfs/RA-379_2012.pdf.
(Continued)

Primary Examiner — Amy Cohen Johnson
Assistant Examiner — Matthew T Dzierzynski
(74) Attorney, Agent, or Firm — Mark M. Friedman

(57) ABSTRACT

The present invention discloses a universal electrical installation system including a fixing frame having a top pert having provisions for fixation of an insert, a bottom part configured to be engaged with the top part wherein the bottom part comprises provisions for terminal blocks that are capable of being attached or removed at any desired location, the terminal blocks interface a load to the fixing frame, current carrying electrical rails housed within the fixing frame, termination points for connecting the current carrying electrical rails to a power source through predetermined positions for live, neutral and earth connections, wherein the current carrying electrical rails are disposed along the entirety of the fixing frame in a manner that when the insert is engaged therein, one or more conductive elements of the insert is capable of interfacing with the said current carrying electrical rails in multiple positions.

14 Claims, 8 Drawing Sheets

(58) Field of Classification Search
CPC .. H01R 9/2466; H01R 9/2475; H01R 9/2675; H02B 1/056; H02B 1/205; H02B 1/21; H02B 1/22; H02B 1/40
See application file for complete search history.

(56) References Cited

U.S. PATENT DOCUMENTS

| | | | | |
|---|---|---|---|---|
| 6,778,368 | B2* | 8/2004 | Habedank | H02G 5/005 |
| | | | | 361/62 |
| 6,838,852 | B1 | 1/2005 | Namuduri | |
| 7,173,809 | B2* | 2/2007 | Bauer | H01R 9/2675 |
| | | | | 361/611 |
| 7,279,635 | B2 | 10/2007 | Hyde | |
| 7,497,273 | B2 | 3/2009 | Schoettle | |
| 8,025,528 | B2 | 9/2011 | Smith | |
| 8,531,820 | B2* | 9/2013 | Barnas | H02B 1/056 |
| | | | | 361/624 |
| 8,569,619 | B2 | 10/2013 | Gretz | |
| 8,658,895 | B1 | 2/2014 | Gretz | |
| 8,821,170 | B1 | 9/2014 | Thein et al. | |
| 8,847,071 | B2 | 9/2014 | Castaldo | |
| 2015/0093925 | A1* | 4/2015 | Bruchmann | H01R 13/62933 |
| | | | | 439/153 |
| 2017/0025830 | A1* | 1/2017 | Cordova Diaz | H02B 1/056 |

FOREIGN PATENT DOCUMENTS

| | | | | |
|---|---|---|---|---|
| GB | 2496683 A | * | 5/2013 | H01R 9/24 |
| WO | 2008104743 | | 9/2008 | |

OTHER PUBLICATIONS

McKinney and Assa Abloy, "Transfer Device Solutions" Copyright 2009-2011, online link: http://www.mckinneyhinge.com/PageFiles/1214857/51415%20Transfer%20Device%20Catalog%20%201.13.11.pdf.

* cited by examiner

802

UNIVERSAL ELECTRICAL INSTALLATION SYSTEM

FIELD OF THE INVENTION

The present invention generally relates to electrical fixing frame, in particular, the present invention relates to a universal electrical installation system including a modular fixing frame integrated with metal parts with provisions for electrical connections for switches, sockets and other control devices.

BACKGROUND OF THE INVENTION

In the current scenario, electrical installation boxes are used to mount the fixing frames and then the inserts and aesthetic frames. The box houses all the wirings. Every insert that is mounted on the fixing frame is required to be wired separately. This is a time consuming process especially in cases of 4 modules and higher modularity frames. Further accommodation of more than one insert is also time-consuming. In case the end user wishes to interchange the inserts, the existing system is monotonous and complex. Furthermore, replacing the inserts requires a certified electrician. The end user is unable to make such changes in the inserts at will due to this constraint.

In view of the above discussion, it may be realized that there is a need to design an electrical installation system that reduces installation time, give more aesthetic options for the inserts and make interchangeability of the inserts very simple.

SUMMARY OF THE INVENTION

The main objective of the present invention is to provide a universal electrical installation system wherein installation and wiring is done at one time on the electrical installation unit as opposed to wiring individual switches and sockets separately.

Another objective of the present invention is to provide a universal electrical installation system, which ensures wireless installation of switches and sockets and other control devices.

Another objective of the present invention is to provide a universal electrical installation system, which is less time consuming and ensures easy installation.

Another objective of the present invention is to provide universal electrical installation system, wherein the switches and sockets can be installed/replaced by the end user without the knowledge in wiring.

Another objective of the present invention is to provide universal electrical installation system, which eliminates the process of looping from one insert to the other.

In order to achieve the above mentioned objectives, the present invention discloses a universal electrical installation system including a fixing frame having a top part having provisions for fixation of an insert, a bottom pan configured to be engaged with the top part wherein the bottom part comprises provisions for terminal blocks that are capable of being attached or removed at any desired location thereof, the terminal blocks interface a bad to the fixing frame, current carrying electrical rails housed within the fixing frame, termination points for connecting the current carrying electrical rails to a power source through pre-determined positions for live, neutral and earth connections, wherein the current carrying electrical rails are disposed along the entirety of the fixing frame in a manner that when the insert is engaged therein, one or more conductive elements of the insert is capable of interfacing with the said current carrying electrical rails in multiple positions.

In one embodiment the universal electrical installation system may include an intermediate part for housing the current carrying electrical rails.

In one embodiment, the current carrying electrical rails may be live, neutral and earth rails.

In one embodiment, the termination points are insulated and sandwiched between the top part and the bottom part of the fixing frame.

In one embodiment, the termination points are an integral part of the current carrying electrical rails. In another embodiment, the termination points may make electrical connection to the current carrying electrical rails by any mechanical means.

In one embodiment, the termination points include one of screw terminals, screw less terminals, insulation piercing terminals and the power source is attached to the live, neutral and earth rails via one of screw terminals, screw less terminals, insulation piercing terminals.

In one embodiment, the top part, the intermediate past and the bottom part of the fixing frame are made of electrically non-conductive material.

In one embodiment, the live, neutral, earth rails and the conductive elements of the insert/terminal block are made of electrically conductive materials.

In one embodiment, the universal electrical installation system may include recesses in predefined locations to accept the conductive element of the insert, wherein the recesses are placed in a manner that the inserts are capable of being engaged interchangeably at any location.

In one embodiment, the insert may include socket or a switch or any control device.

In one embodiment, the current carrying electrical rails are integrated permanently with the fixing frame by molding plastic manufacturing process, thereby insulating the current carrying electrical rails and rendering the fixing frame into a single unit.

In one embodiment, the fixing frame is self powered by any means for providing a wireless electrical installation system.

In one embodiment, the inserts are either snap-fitted into the fixing frame unit engaged by any mechanical fixation mode.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and other advantages of the invention will be better understood and will become more apparent by referring to the exemplary embodiments of the invention, as illustrated in the accompanying drawings, wherein.

DETAIL DESCRIPTION OF THE INVENTION

Reference will now be made to the exemplary embodiments of the invention, as illustrated in the accompanying drawings. Where ever possible same numerals will be used to refer to the same or like parts.

Disclosed herein is a universal electrical installation box with pre-wired electrical connections. The universal electrical installation box includes the current carrying parts integrated into the fixing frame, thereby eliminating the need of wiring of each switch and socket outlet or any control device separately.

Integration of current carrying parts into the traditional fixing frame is done in a manner such that the sockets and switches tap power from the current denying parts. Hence wiring for the switches and sockets and other control devices can be eliminated.

Figure 1:
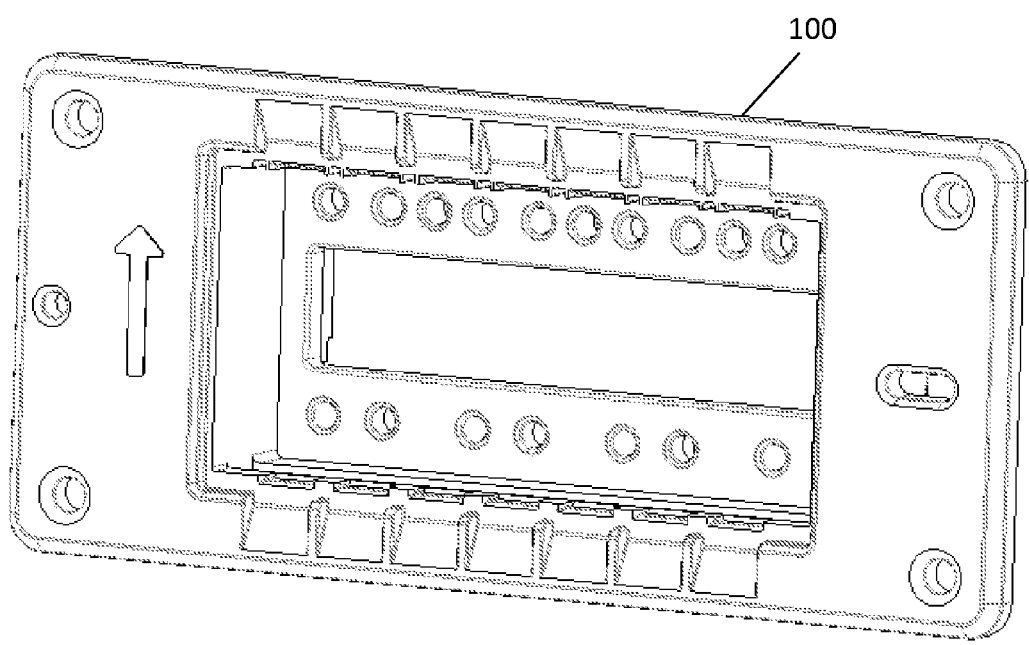
FIG. 1 illustrates a universal electrical installation box with pre-wired electrical connections in accordance with one embodiment of the present invention.
Figure 2:
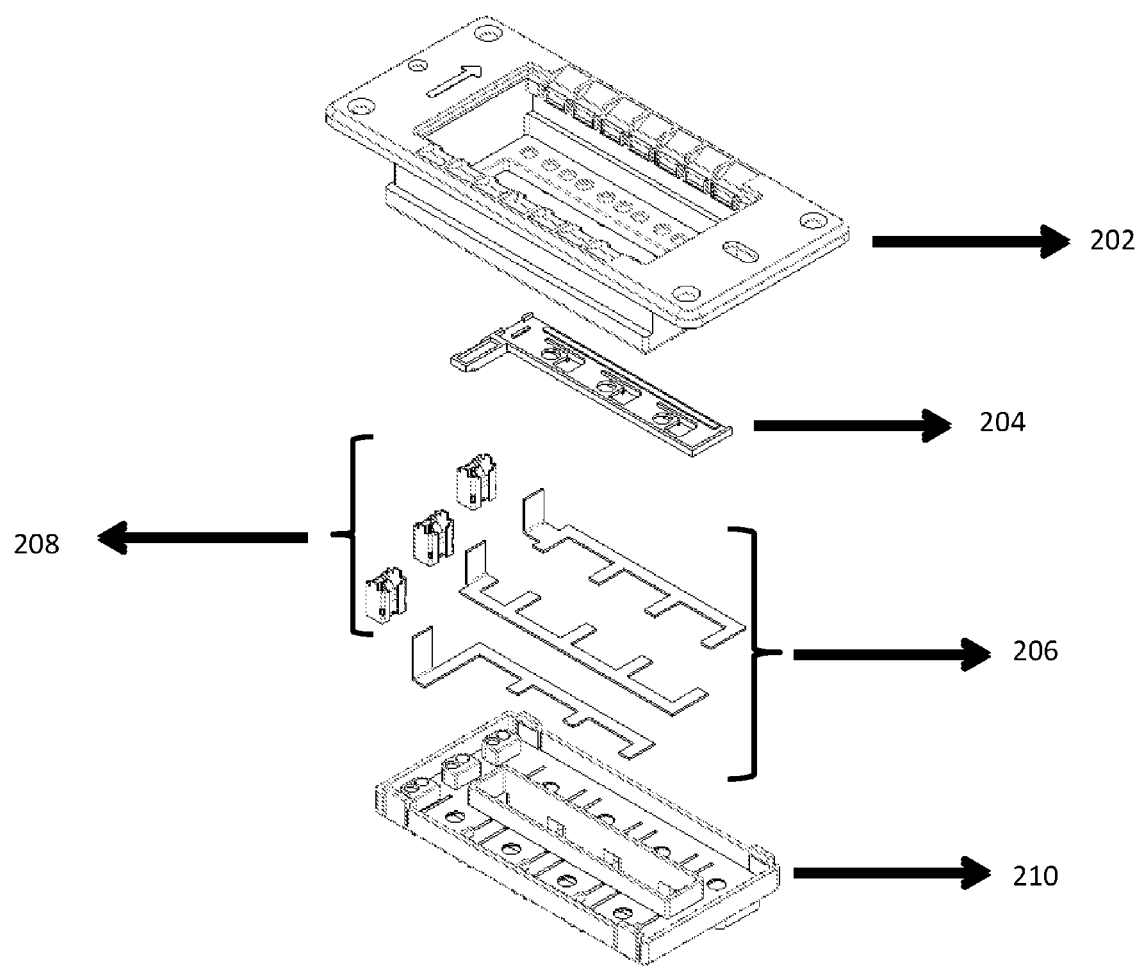
FIG. 2 illustrates an exploded view of a universal electrical installation box with pre-wired electrical connections with different components in accordance with one embodiment of the present invention.

The details of integration of current carrying parts and tapping power are explained in the FIGS. 1-6. FIG. 1 illustrates such a universal electrical installation box 10 with pre-wired electrical connections in accordance with one embodiment of the present invention. FIG. 2 illustrates an exploded view of a universal electrical installation box with pre-wired electrical connections with different components in accordance with one embodiment of the present invention. The universal electrical installation box includes a fixing frame having a top part 202 integrated with the current carrying parts such as Live and Neutral rails and having provisions for fixation of an insert. An intermediate part 204 is integrated with Earth rails 206 and is configured to be placed over the top part for providing insulation to the live and neutral rails. Finally, an enclosing part 210 is engaged to provide insulation to the current carrying parts. The bottom part 210 includes provisions for terminal blocks that are capable of being attached or removed at any desired location; the terminal block interfaces a load to the fixing frame. The live, neutral and earth rails are positioned within the fixing frame and disposed along the entire length of the frame in a manner that when the insert is engaged, the conductive elements of the insert is capable of interfacing with the live, neutral and earth rails in multiple positions.

Figure 3:
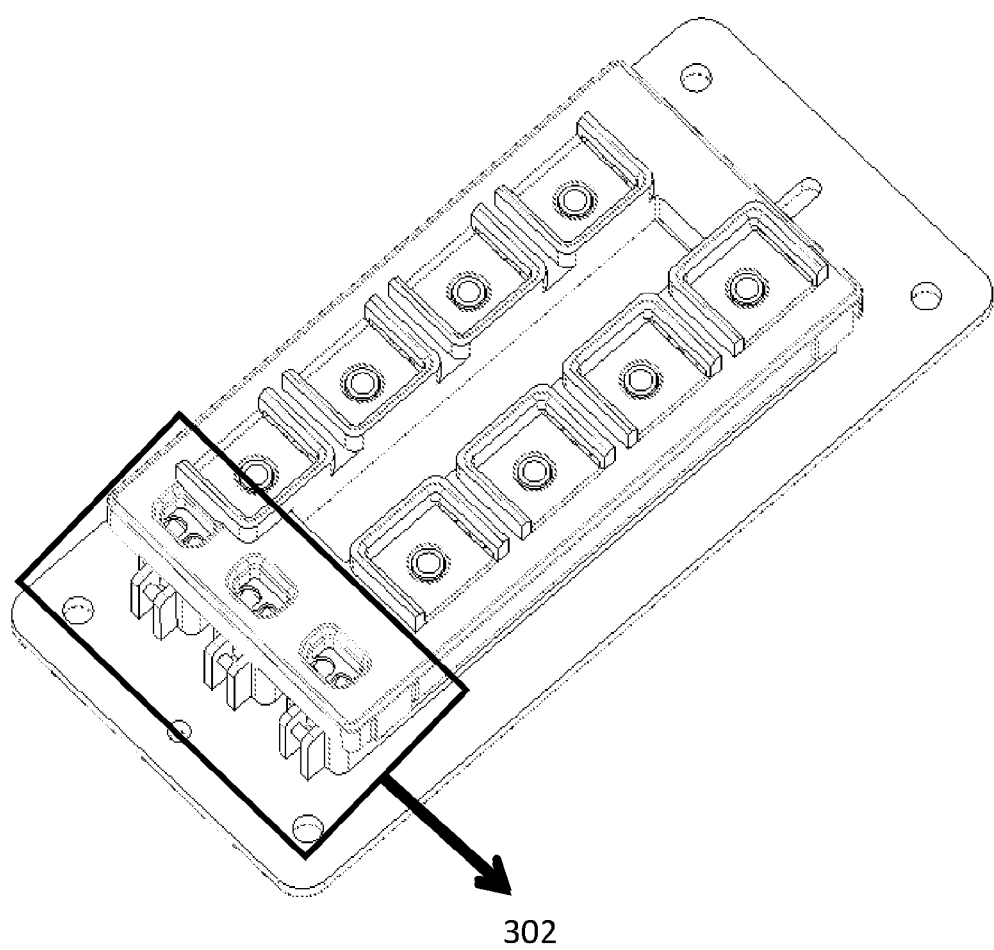
FIG. 3 illustrates termination points for fixation with the rails from the source according to one embodiment of the present invention.

FIG. 3 illustrates termination points for fixation with the rails from the source according to one embodiment of the present invention. The termination points (208, 302) are where the live neutral and earth rails are attached to the power source (wires, conductors) through pre-determined positions for the live, neutral and earth. The termination points can be screw terminals, screw-less terminals, insulation piercing terminals and so forth. The attachment of the power source to Live neutral and earth rails can be by means of screw terminals, screw fixation, snap fixation, or any type of permanent fixation.

Figure 4:
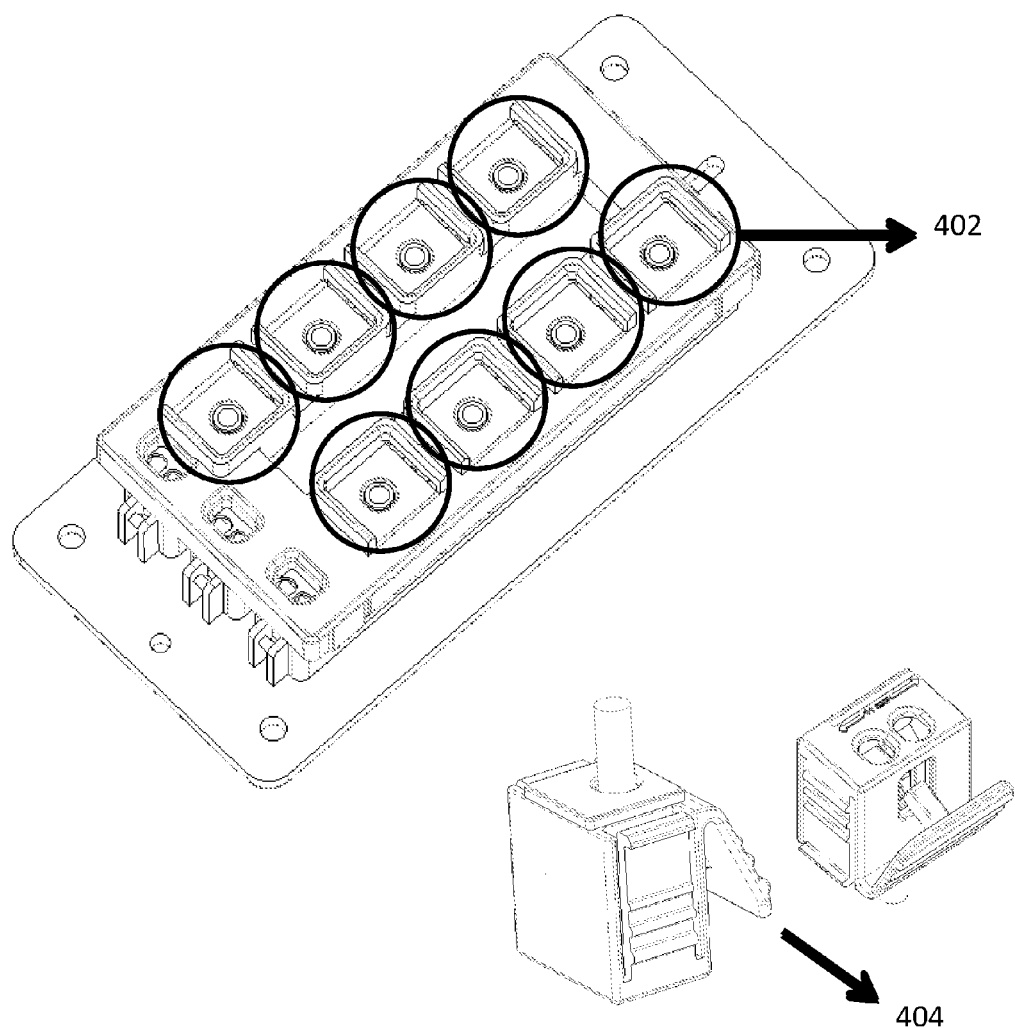
FIG. 4 illustrates terminal bock for switch interface and provisions for the terminal block according to one embodiment of the present invention.
Figure 5:
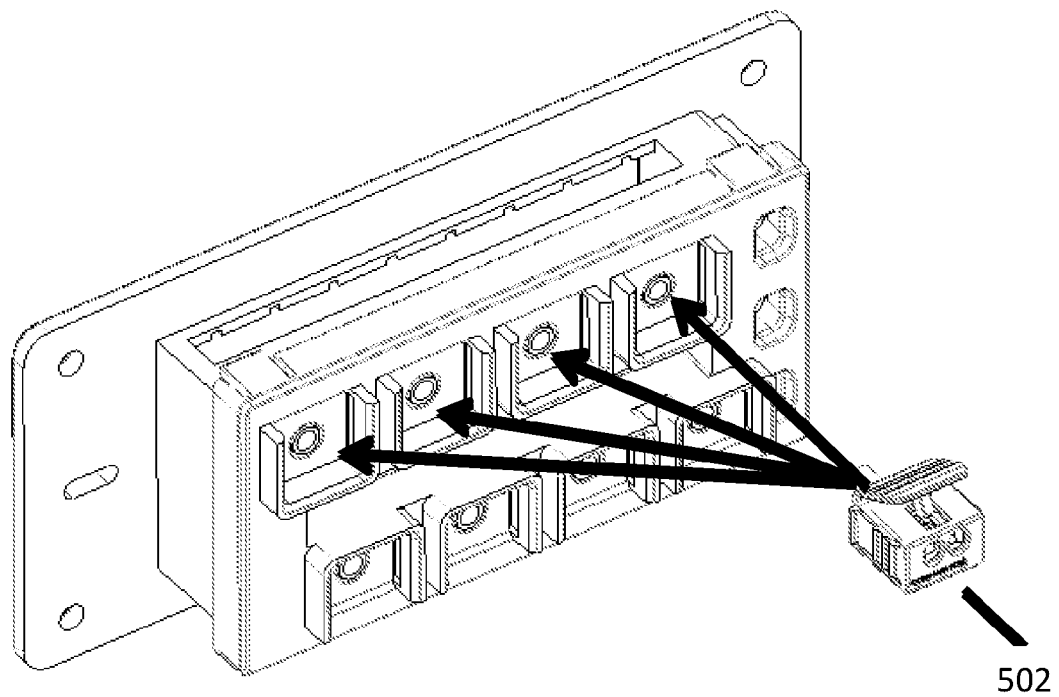
FIG. 5 illustrates process of loading switch interface with the terminal block according to one embodiment of the present invention.
Figure 6:
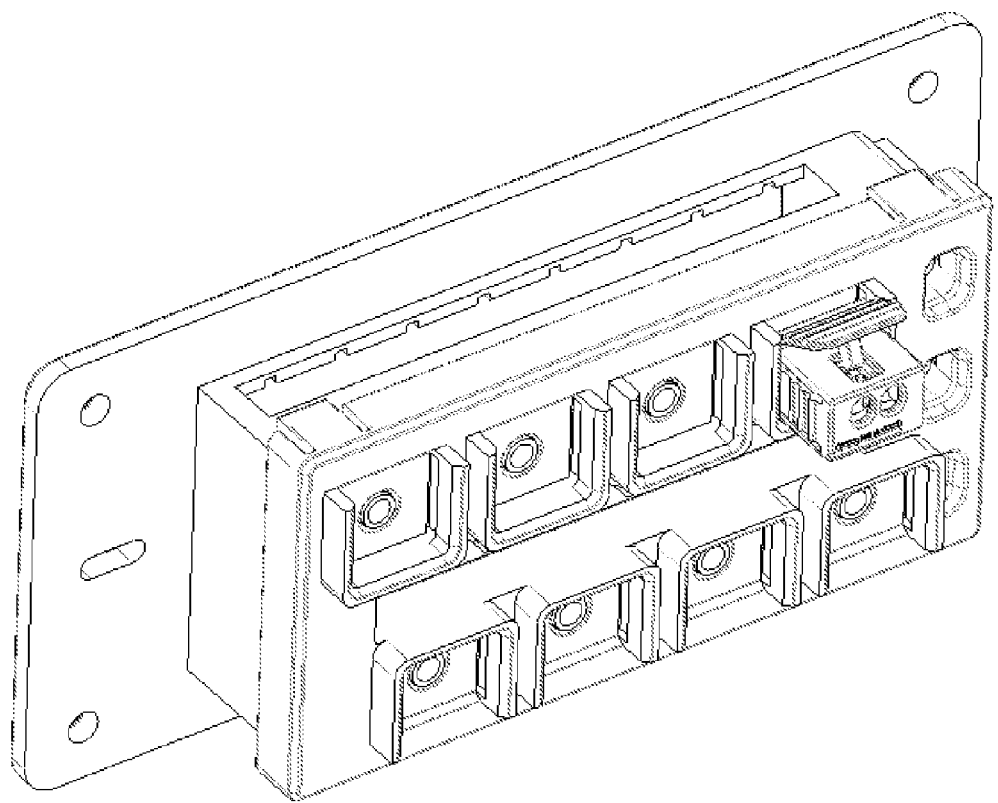
FIG. 6 illustrates a switch interface in the engaged position with a terminal block according to one embodiment of the present invention.

FIG. 4 illustrates terminal bock for switch interface and provisions (402) for the terminal blocks (404) according to one embodiment of the present invention. FIG. 5 illustrates process of loading (502) switch interface with the terminal block and FIG. 6 illustrates a switch interface in the engaged position with a terminal block. The universal electrical installation box includes recesses/provisions (402) placed in predefined locations which provide a channel to interface the conductive element of the insert, wherein the recesses/provisions are placed in a manner that the inserts can be engaged interchangeably at any location. The pre-defined layout of the recesses/provision is unique layout/format which allows the interchangeability between inserts. Another advantage of the layout is, the configuration can accommodate different patterns of switch.

Figure 7:
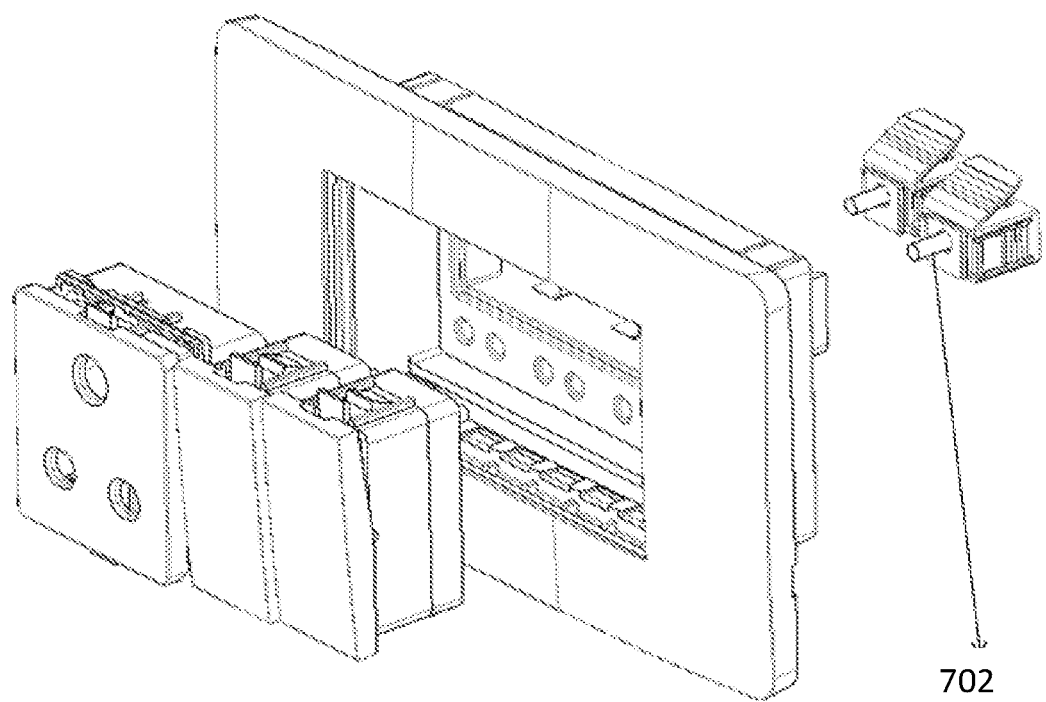
FIG. 7 illustrates conductive element of a terminal block capable of being engaged into a universal electrical installation box according to one embodiment of the present invention.
Figure 8:
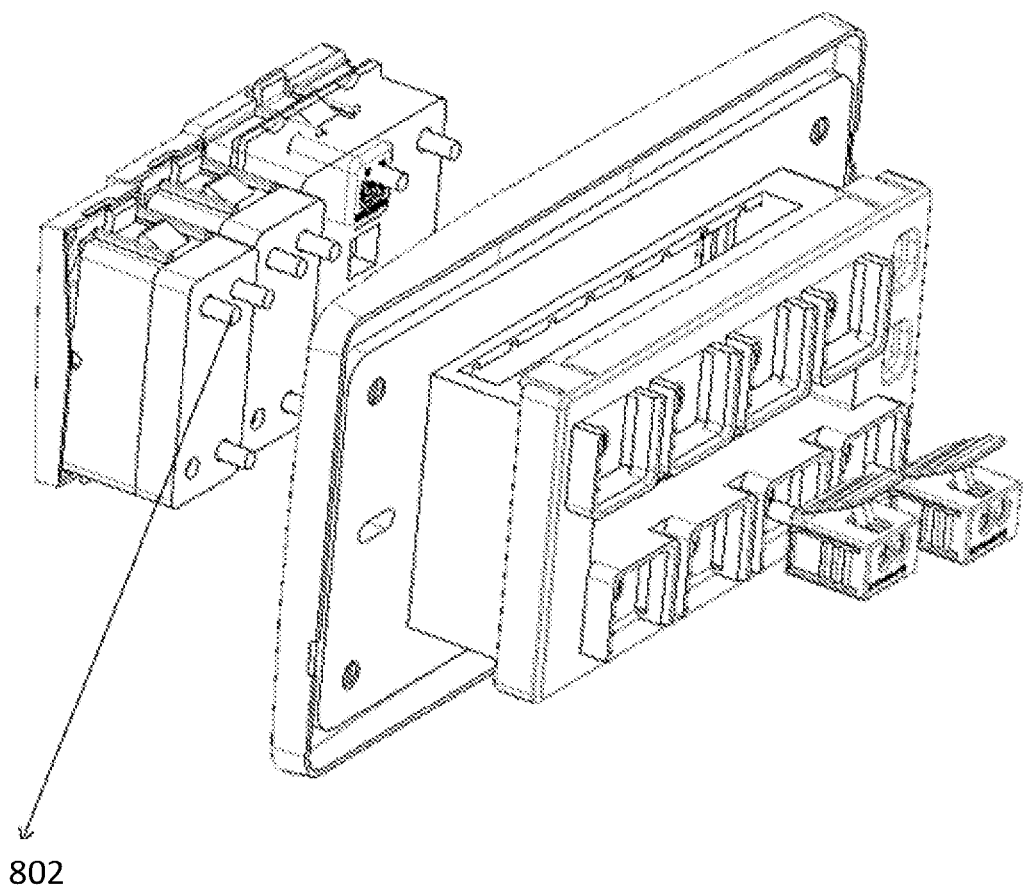
FIG. 8 illustrates conductive element of an insert capable of being engaged into a universal electrical installation box according to one embodiment of the present invention.

FIG. 7 illustrates conductive element (702) of a terminal block capable of being engaged into a universal electrical installation box according to one embodiment of the present invention. Similarly, FIG. 8 illustrates conductive element (802) of an insert capable of being engaged into a universal electrical installation box according to one embodiment of the present invention.

One advantage of the present system is wiring need to be done one time on the electrical installation unit as opposed to wiring individual switches and sockets separately. Also it ensures wireless installation of switches and sockets and other control devices. The present method is less time consuming and ensures easy installation as it is done on a single component (Frame) as opposed to wiring individual sockets and switches and other control devices. Further the switches and sockets can be installed/replaced by the end user without the knowledge in wiring. The present invention also eliminates the process of looping from one insert to the other, as the electrical conductors/rails once wired carry the current to multiple inserts, thus eliminating looping of inserts. The present invention allows the interchangeability between inserts and the present configuration can accommodate different patterns of switches.

It is to be understood by a person of ordinary skill in the art that various modifications and variations may be made without departing from the scope and spirit of the present invention. Therefore, it is intended that the present invention covers such modifications and variations provided they come within the ambient of the appended claims and their equivalents.

We claim:

1. A universal electrical installation system comprising:
a fixing frame including:
a top part including a plurality of receivers, each of the receivers configured for receiving an insert at multiple positions, the top part defining a first side;
a bottom part defining a second side disposed opposite the first side, the bottom part configured to be engaged with the top part, and the bottom part is configured for receiving terminal blocks that are removably attachable from multiple locations along the bottom part, the terminal blocks provide a load to the fixing frame, a plurality of current carrying electrical rails including each of a neutral rail, an earth rail and a live rail housed within the fixing frame;

termination points for operatively coupling each of the current carrying electrical rails to a power source;

the top part configured for providing access to the current carrying electrical rails by one or more inserts from the first side, such that the one or more inserts are in electrical communication with the current carrying electrical rails; and, the bottom part configured for providing access to the current carrying electrical rails by one or more terminal blocks from the second side, such that the one or more terminal blocks are in electrical communication with the current carrying electrical rails.

2. The universal electrical installation system of claim 1, comprising an intermediate part for housing the current carrying electrical rails.

3. The universal electrical installation system of claim 1, wherein the termination points are insulated and sandwiched between the top part and the bottom part of the fixing frame.

4. The universal electrical installation system of claim 1, wherein the termination points are a integral with the current carrying electrical rails.

5. The universal electrical installation system of claim 1, wherein the operative coupling of the termination points to the current carrying electrical rails includes an electrical connection via mechanical means.

6. The universal electrical installation system of claim 1, wherein the termination points comprise one of screw terminals, screw less terminals, insulation piercing terminals, and, the live, neutral and earth rails, via one of screw terminals, screw less terminals, insulation piercing terminals, are configured for connecting to the power source.

7. The universal electrical installation system of claim 2, wherein the top part, the intermediate part and the bottom part, of the fixing frame, are made of electrically non-conductive material.

8. The universal electrical installation system of claim 1, wherein the live, neutral, earth rails and the conductive elements of the insert are made of electrically conductive materials.

9. The universal electrical installation system of claim 1, wherein the receivers include recesses in predefined locations configured to accept conductive elements of each of the one or more inserts.

10. The universal electrical installation system of claim 1, wherein each of the one or more inserts comprises at least one of a socket, a switch, or a control device.

11. The universal electrical installation system of claim 1, wherein the current carrying electrical rails are integrated permanently with the fixing frame by a plastic molding manufacturing process, thereby insulating the current carrying electrical rails and rendering the fixing frame as a single unit.

12. The universal electrical installation system of claim 1, wherein the current carrying electrical rails of the fixing frame provide an electrical installation system, where switches, sockets and control devices, are not connected by wired connections.

13. The universal electrical installation system of claim 1, wherein each of the inserts is configured to be at least one of: snap-fitted into the fixing frame unit, or engaged by any mechanical fixation mode.

14. The universal electrical installation system of claim 13, wherein each of the inserts includes a switch.

* * * * *